US012459266B2

(12) United States Patent
Tanaka et al.

(10) Patent No.: US 12,459,266 B2

(45) Date of Patent: Nov. 4, 2025

(54) LIQUID EJECTING DEVICE

(71) Applicant: SEIKO EPSON CORPORATION, Tokyo (JP)

(72) Inventors: Takuto Tanaka, Shiojiri (JP); Yoshikane Tsuchihashi, Matsumoto (JP); Yoshinori Yanagisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 18/544,695

(22) Filed: Dec. 19, 2023

(65) Prior Publication Data

US 2024/0208231 A1 Jun. 27, 2024

(30) Foreign Application Priority Data

Dec. 21, 2022 (JP) ................................ 2022-204117

(51) Int. Cl.
*B41J 2/175* (2006.01)
*B41J 29/02* (2006.01)

(52) U.S. Cl.
CPC .............. *B41J 2/175* (2013.01); *B41J 29/02* (2013.01)

(58) Field of Classification Search
CPC .... B41J 2/175; B41J 2/17502; B41J 2/17509; B41J 2/17553; B41J 29/02; B41J 29/13
See application file for complete search history.

(56) References Cited

FOREIGN PATENT DOCUMENTS

| | | | | |
|---|---|---|---|---|
| JP | 2006198772 | * | 8/2006 | ............. B41J 29/12 |
| JP | 2015-018089 A | | 1/2015 | |

* cited by examiner

*Primary Examiner* — Anh T Vo
(74) *Attorney, Agent, or Firm* — WORKMAN NYDEGGER

(57) ABSTRACT

A printer includes: a head that ejects ink; a storage portion that stores the ink to be supplied to the head and is coupled to the head; a main body that includes the head and the storage portion; a first handle portion that is grippable and provided in a left side surface of the main body; and a second handle portion that is grippable and provided in a right side surface of the main body, the right side surface facing the left side surface, in which the storage portion is provided at a position between the head and the left side surface in an X-axis direction, and the first handle portion is positioned higher than the second handle portion in the direction of gravity.

11 Claims, 10 Drawing Sheets

LIQUID EJECTING DEVICE

The present application is based on, and claims priority from JP Application Serial Number 2022-204117, filed Dec. 21, 2022, the disclosure of which is hereby incorporated by reference herein in its entirety.

BACKGROUND

1. Technical Field

The present disclosure relates to a liquid ejecting device.

2. Related Art

JP-A-2015-18089 discloses an image forming device of which components are housed in a substantially rectangular parallelepiped housing and in which a recessed first handle and a recessed second handle for carrying the device are formed on one side surface and the other side surface of the housing, respectively. In order to implement size reduction of the device, the first handle is disposed in a space between the components vertically arranged in a height direction within the housing, and the second handle is positioned lower than the first handle in the height direction.

However, in a case in which the positions of the first handle and the second handle in the height direction are different from each other as in JP-A-2015-18089, when the device is lifted by gripping the first handle and the second handle, the device is tilted relative to the normal posture. When the configuration in which the positions of the first handle and the second handle in the height direction are different from each other is applied to a liquid ejecting device that ejects liquid from an ejecting portion, there is a possibility that the liquid leaks from the ejecting portion due to tilting of the device during transportation.

SUMMARY

A liquid ejecting device includes: an ejecting portion that ejects liquid; a storage portion that stores the liquid to be supplied to the ejecting portion and is coupled to the ejecting portion; a main body that includes the ejecting portion and the storage portion; a first handle portion that is grippable and provided in a first side surface of the main body; and a second handle portion that is grippable and provided in a second side surface of the main body, the second side surface facing the first side surface, in which the storage portion is provided at a position between the ejecting portion and the first side surface in a horizontal direction, and the first handle portion is positioned higher than the second handle portion in the direction of gravity.

DESCRIPTION OF EMBODIMENTS

Figure 1:
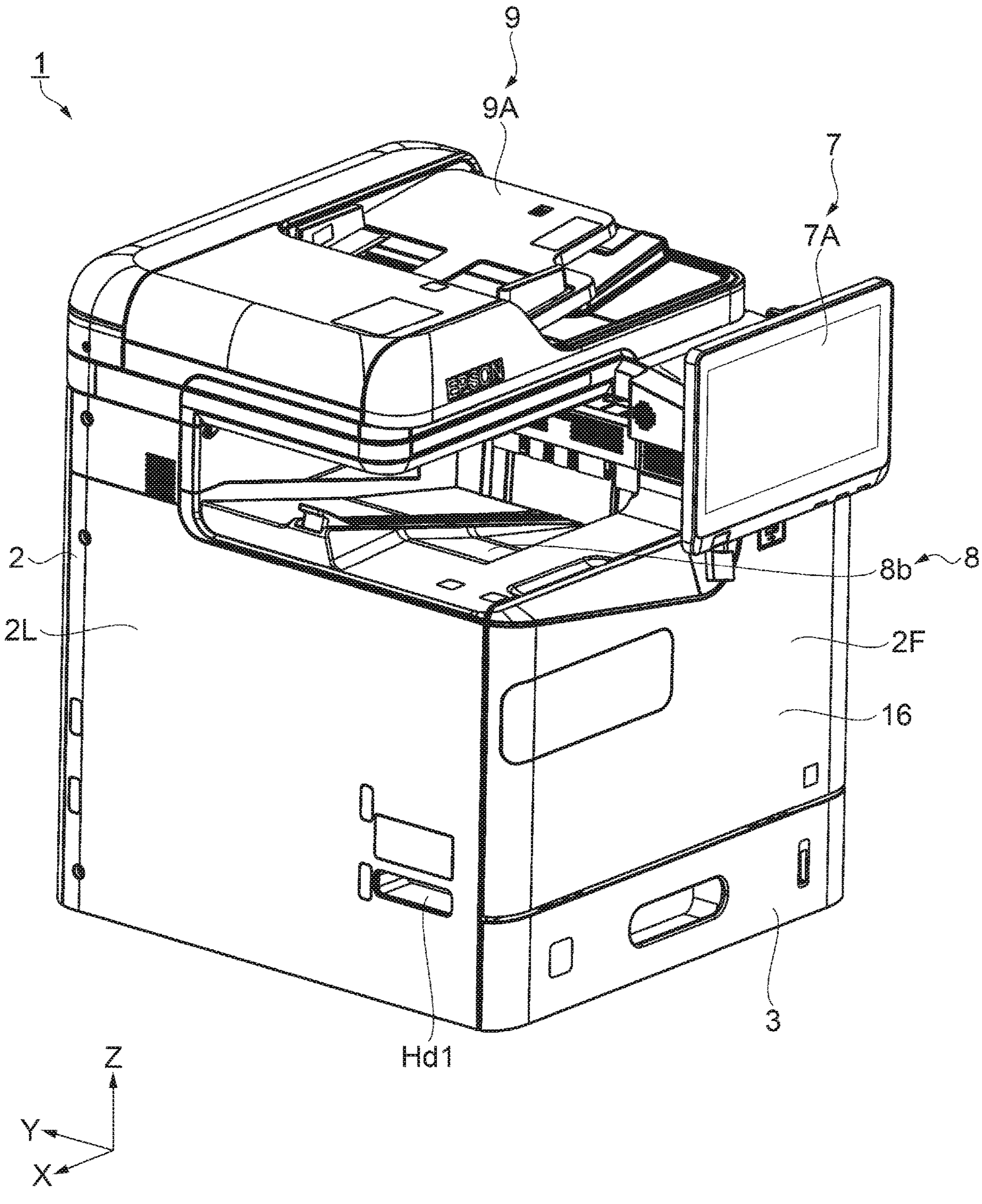
FIG. 1 is an external perspective view illustrating a main body of a printer.

Hereinafter, the present disclosure will be described based on embodiments. In each drawing, the same members are denoted by the same reference numerals, and redundant descriptions are omitted. In the present specification, the terms “same”, “identical”, and “simultaneously” do not simply refer to being exactly the same. For example, in the present specification, the terms “same”, “identical”, and “simultaneously” encompass a case of being the same in consideration of measurement errors.

For example, in the present specification, the terms “same”, “identical”, and “simultaneously” encompass a case of being the same in consideration of manufacturing variations of members. Further, for example, in the present specification, the terms “same”, “identical”, and “simultaneously” encompass a case of being the same to the extent that the function is not impaired. Therefore, for example, the expression “dimensions of both of them are the same” means that a dimensional difference between the two is within ±5% with respect to the dimension of one of the two, particularly preferably within ±3%, taking into account measurement errors and manufacturing variations of members.

1. First Embodiment

In the present embodiment, a printer 1 is configured as an ink jet printer, and performs recording by ejecting ink onto a medium P. The printer 1 is an example of a liquid ejecting device. The ink is an example of liquid. The medium P is not limited to paper, and may be a plastic film or the like.

In each drawing, X, Y, and Z represent three spatial axes orthogonal to one another. In the present specification, directions along these axes are an X-axis direction, a Y-axis direction, and a Z-axis direction. The directions are specified in such a way that a positive direction is indicated as “+” and a negative direction is indicated as “−”, both positive and negative signs are used for direction notation, and a direction in which an arrow points in each drawing is referred to as a + direction, and a direction opposite to the arrow is referred to as a − direction.

Further, the Z-axis direction indicates a direction of gravity, a +Z direction indicates a vertical upward direction, and a −Z direction indicates a vertical downward direction. A plane including the X axis and the Y axis is referred to as an X-Y plane, a plane including the X axis and the Z axis is referred to as an X-Z plane, and a plane including the Y axis and the Z axis is referred to as a Y-Z plane. The X-Y plane is a horizontal plane. Furthermore, the three spatial axes X, Y, and Z, which are not limited to positive and negative directions, are described as the X axis, the Y axis, and the Z axis.

Further, the Y-axis direction is a direction intersecting a transport direction of the medium P, that is, a medium width direction, and is also a device depth direction. In the Y-axis direction, a +Y direction is a direction from the front side of the device toward the back side of the device, and a −Y direction is a direction from the back side of the device to the front side of the device. Furthermore, in the present embodiment, the Y-axis direction is an example of a direction intersecting a V-axis direction which is a movement direction of a head unit 50 described below.

The X-axis direction is a device width direction and is an example of a horizontal direction along a mounting surface G which is a horizontal surface on which the printer 1 is mounted. A +X direction indicates the left side and a −X direction indicates the right side as viewed from an operator of the printer 1. The Z-axis direction is a normal direction with respect to the mounting surface G, that is, a device height direction.

Hereinafter, a direction in which the medium P is fed may be referred to as "downstream", and a direction opposite thereto may be referred to as "upstream". In each drawing, a medium transport path is indicated by a broken line. In the printer 1, the medium P is transported through the medium transport path indicated by the broken line.

Further, an F-axis direction is a medium transport direction between a head 51 of the head unit 50 described below and a transport belt 13, that is, in a recording region. A +F direction indicates downstream in the transport direction, and a −F direction opposite thereto indicates upstream in the transport direction. Further, the V-axis direction orthogonal to the F-axis direction is the movement direction of the head unit 50 described below. Further, in the V-axis direction, a +V direction is a direction in which the head unit 50 moves away from the transport belt 13, and a −V direction is a direction in which the head unit 50 approaches the transport belt 13. In the present embodiment, the V-axis direction is also a direction along inclination of a discharge tray 8 described below.

Figure 2:
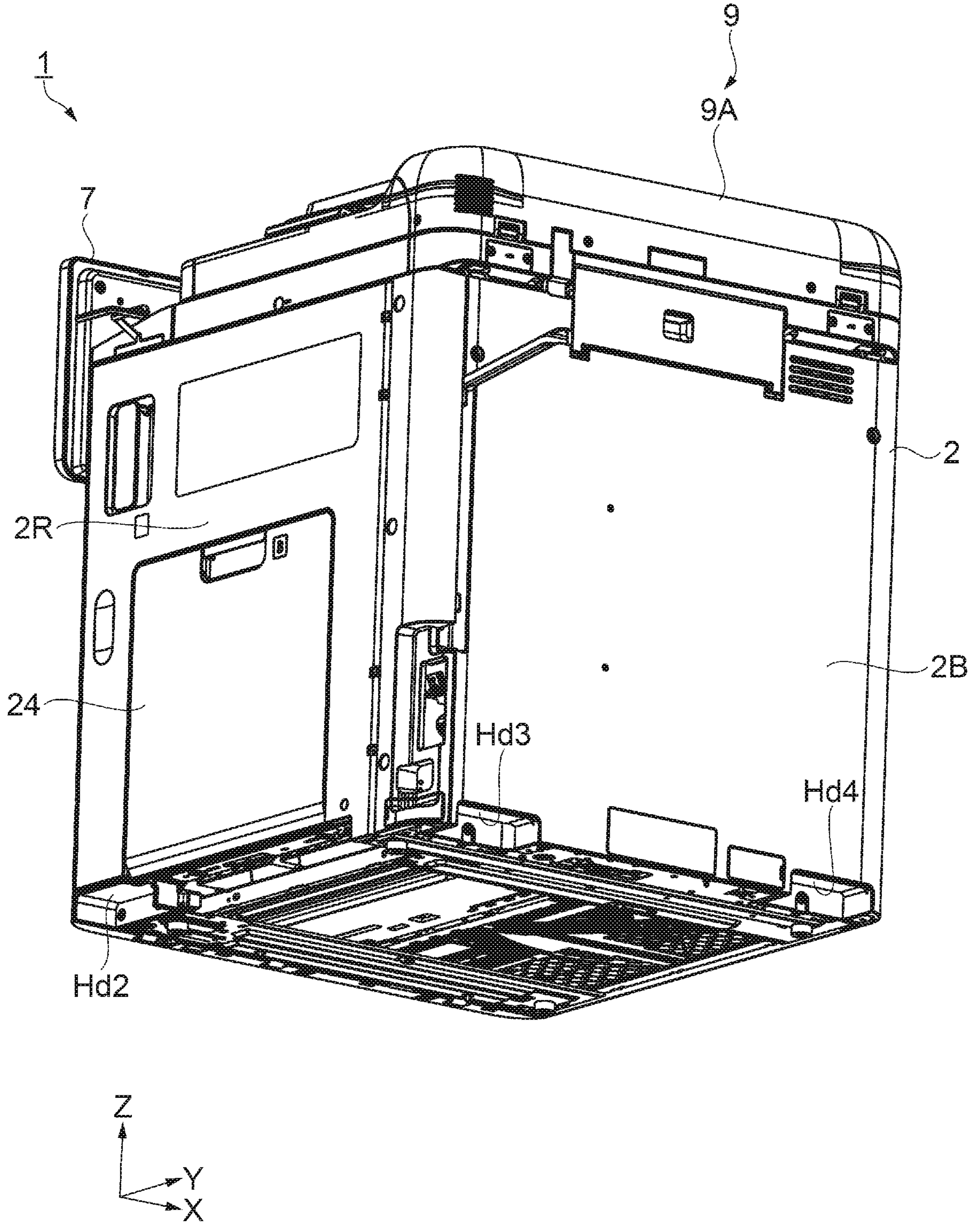
FIG. 2 is an external perspective view illustrating the main body of the printer.

As illustrated in FIGS. 1 and 2, the printer 1 is configured as a multifunction device in which a scanner unit 9 is provided on a main body 2 that performs recording on the medium P. The scanner unit 9 is an example of an image reading device. The scanner unit 9 includes an opening/closing portion 9A that is opened when reading an image of a document. The opening/closing portion 9A rotates around an axis provided at a +Y-direction-side end of the opening/closing portion 9A. Therefore, a −Y-direction-side end of the opening/closing portion 9A is opened and closed in a vertical direction.

The main body 2 has a quadrangular prism shape. The main body 2 has four side surfaces that define an outer contour of the main body 2: a left side surface 2L, a right side surface 2R, a rear side surface 2B, and a front side surface 2F. The right side surface 2R is a side surface that is spaced apart from the left side surface 2L in the X-axis direction and faces the left side surface 2L. The rear side surface 2B is a side surface that intersects the left side surface 2L and the right side surface 2R. The front side surface 2F is a side surface that is spaced apart from the rear side surface 2B in the Y-axis direction and faces the rear side surface 2B. The main body 2 is provided with a medium cassette 3 and a front cover 16, which form a part of the front side surface 2F. The medium cassette 3 can be pulled out in the −Y direction with respect to the main body 2. The front cover 16 can be opened and closed with respect to the main body 2 by rotating around an axis along the X axis. The axis around which the front cover 16 rotates is provided at a −Z-direction-side end of the front cover 16.

The front side surface 2F of the main body 2 is an example of a fourth side surface, and the left side surface 2L of the main body 2 is an example of a first side surface. Further, the rear side surface 2B of the main body 2 is an example of a third side surface, and the right side surface 2R of the main body 2 is an example of a second side surface.

In an upper portion of the main body 2, a part of the front side surface 2F and a part of the left side surface 2L are opened and form a region for taking out the discharged medium P on which recording was performed. The discharge tray 8 supports the discharged medium P. An operation panel 7 is provided on the front side surface 2F of the main body 2. The operation panel 7 protrudes from the front side surface 2F toward the −Y direction. The operation panel 7 includes a display portion 7A. A setting screen and the like for setting the operation of the printer 1 including the main body 2 are displayed on the display portion 7A.

Figure 3:
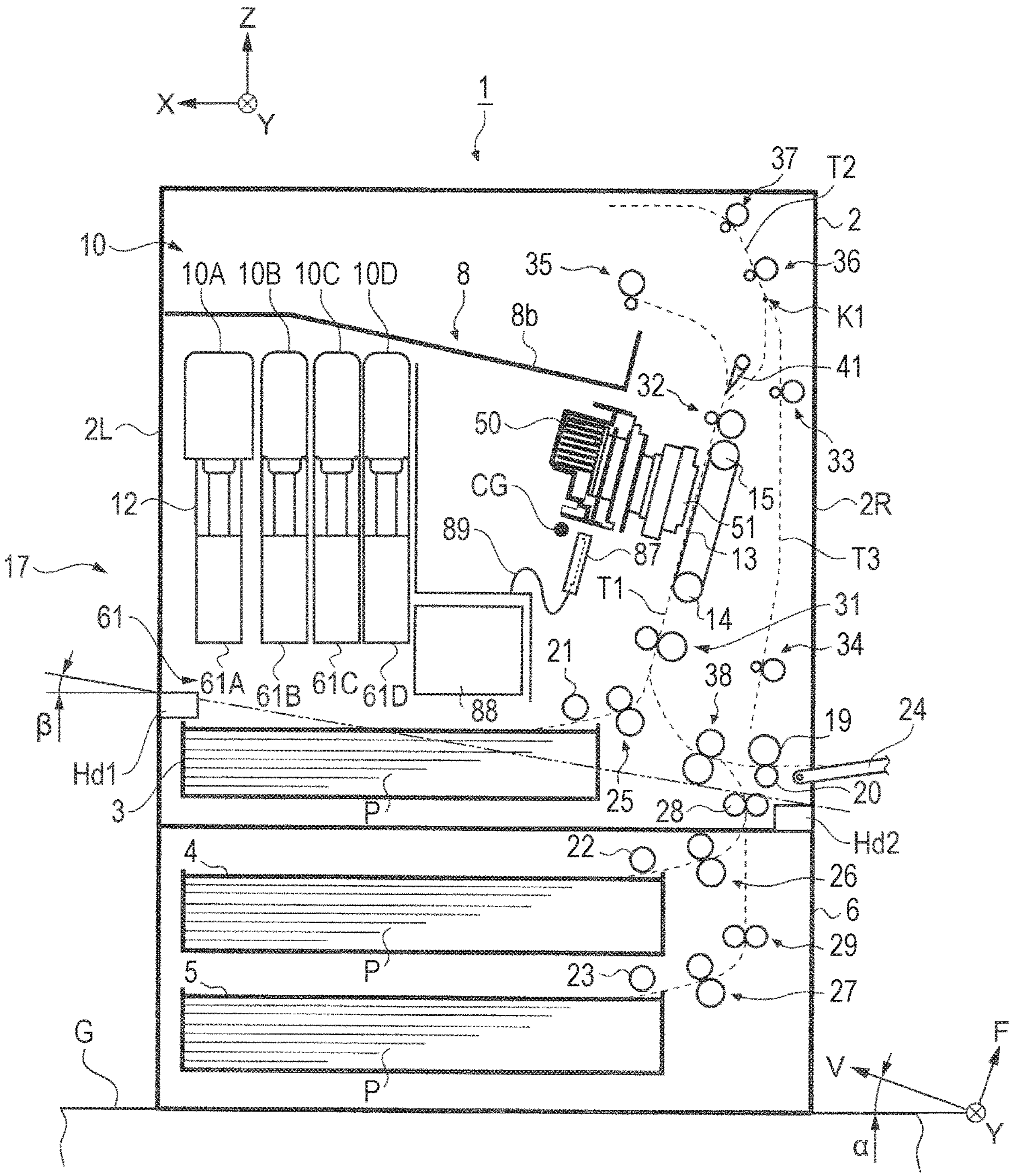
FIG. 3 is a schematic side view illustrating a configuration of the main body and an expansion unit of the printer.

Next, the medium transport path in the printer 1 will be described with reference to FIG. 3. The printer 1 is configured in such a way that an expansion unit 6 can be coupled to a lower portion of the main body 2, and FIG. 3 illustrates a state in which the expansion unit 6 is coupled. When the expansion unit 6 is coupled to the main body 2, the printer 1 includes medium cassettes 4 and 5 provided below the medium cassette 3. The medium cassettes 4 and 5 can be pulled out in the −Y direction with respect to the expansion unit 6.

Pick rollers 21, 22, and 23 for feeding the housed medium P in the −X direction are provided for the medium cassettes 3, 4, and 5, respectively. The pick rollers 21, 22, and 23 are provided for the medium cassettes 3, 4, and 5, respectively.

Further, feed roller pairs 25, 26, and 27 for feeding the medium P fed in the −X direction diagonally upward are provided for the medium cassettes 3, 4, and 5, respectively. The feed roller pairs 25, 26, and 27 are provided for the medium cassettes 3, 4, and 5, respectively. Further, the feed roller pair 25 is provided on a −X direction side, which is a right side surface 2R side, with respect to the center of the main body 2. In the following description, unless otherwise specified, a "roller pair" includes a drive roller driven by a motor (not illustrated) and a driven roller that rotates in contact with the drive roller.

The medium P fed from the medium cassette 5 is fed to a transport roller pair 38 by transport roller pairs 29 and 28. Further, the medium P fed from the medium cassette 4 is fed to the transport roller pair 38 by the transport roller pair 28. The medium P is nipped by the transport roller pair 38 and fed to a transport roller pair 31. The medium P fed from the medium cassette 3 is fed to the transport roller pair 31 without passing through the transport roller pair 38. A supply roller 19 and a separation roller 20 provided near the transport roller pair 38 are a roller pair for feeding the medium P from a supply tray 24.

The medium P that receives a feeding force from the transport roller pair 31 is fed to a recording position between the head 51 and the transport belt 13, that is, a recording position that faces the head 51. Hereinafter, the medium transport path from the transport roller pair 31 to a transport roller pair 32 is referred to as a recording transport path T1.

The head 51 is included in the head unit 50. The head 51 performs recording by ejecting the ink in the −V direction toward a surface of the medium P. The head 51 is an example of an ejecting portion. The −V direction is an example of a first direction that intersects the horizontal direction and the direction of gravity. The head 51 is provided on the right side surface 2R side with respect to the center of the main body 2. It can also be said that the right side surface 2R is provided on a −V direction side of the head 51.

The head 51 is a line ink head configured in such a way that nozzles N (see FIG. 6) that eject the ink cover the entire area in the medium width direction. The head 51 is configured as an ink ejection head capable of performing recording over the entire medium width without moving in the medium width direction. However, the ink ejection head is not limited thereto, and may be of a type that is mounted on a carriage and ejects the ink while moving in the medium width direction.

Figure 4:
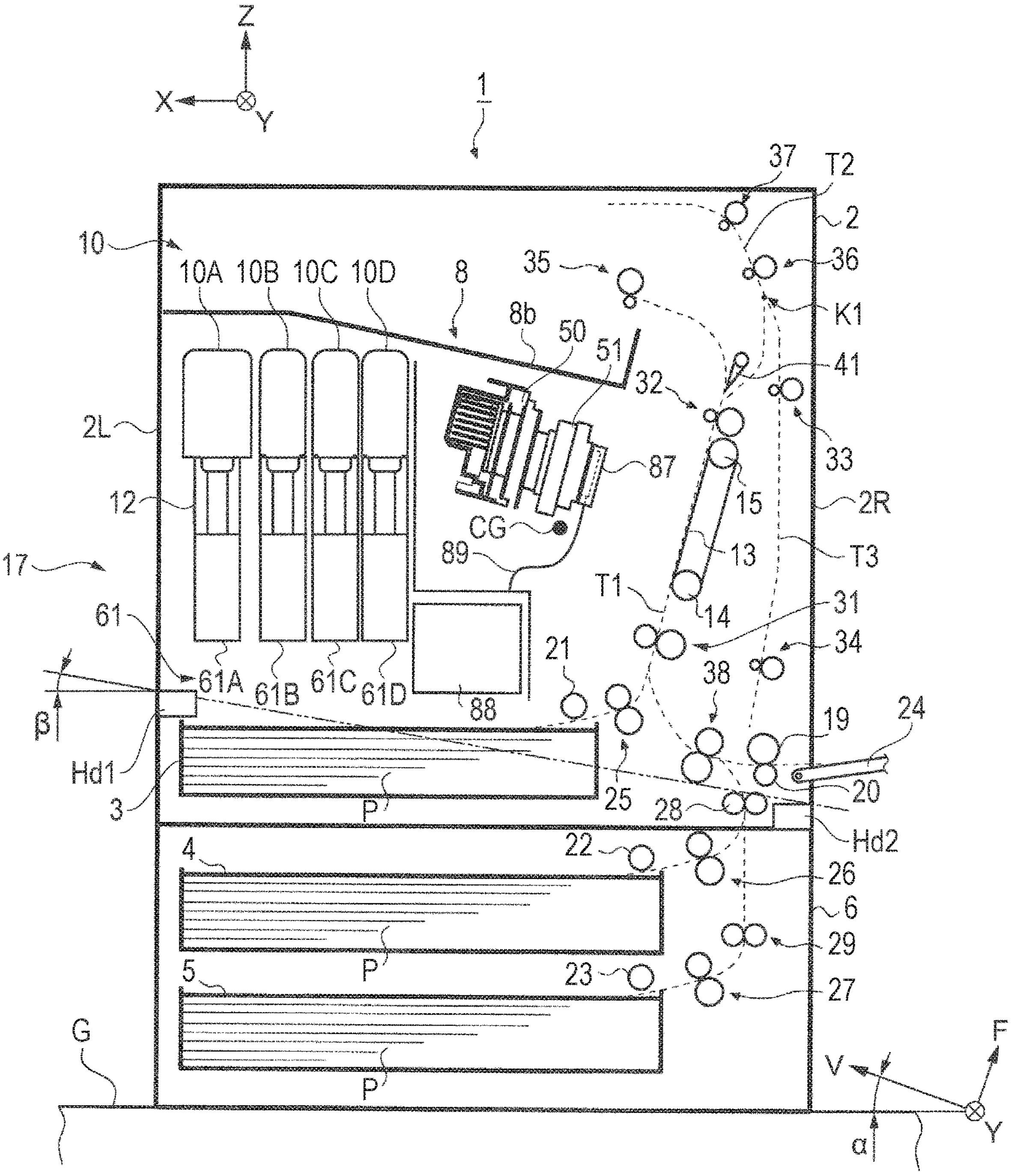
FIG. 4 is a schematic side view illustrating the configuration of the main body and the expansion unit of the printer.

The head unit 50 is provided in the main body 2 in such a way as to be movable forward and backward with respect to the recording transport path T1, and is movable between a first position illustrated in FIG. 3 and a second position that is away from the transport belt 13 as illustrated in FIG. 4. When the head unit 50 is at the first position, recording is performed on the medium P. When the head unit 50 is at the second position, maintenance of the head 51 is performed by a receiving portion 87.

In the present embodiment, the movement direction of the head unit 50 is the V-axis direction along the inclination of the discharge tray 8. In other words, the head unit 50 and the head 51 move in the −V direction in which the head 51 ejects the ink. The head unit 50 is positioned below the discharge tray 8 and upstream in a medium discharge direction, and is displaced along a lower surface of the discharge tray 8. The head unit 50 may be provided in such a way as to move to positions different from the first position and the second position in the V-axis direction.

In the present embodiment, an angle α formed by the V-axis direction, which is the movement direction of the head unit 50 and the head 51, and the horizontal direction is set in a range of 35° to 5°, and more specifically, set to 15°. The angle α is an example of a first angle.

As illustrated in FIG. 3, an attachment portion 12 included in a supply section 17 is provided on a left side surface 2L side with respect to the center of the main body 2. A liquid container 10 is detachably attached to the attachment portion 12. In the present embodiment, four liquid containers 10A, 10B, 10C, and 10D as the liquid container 10 are detachably attached to the attachment portion 12. The liquid container 10 stores the ink to be ejected from the head 51. The liquid container 10 can be attached to and detached from the attachment portion 12 by opening the front cover 16 (see FIGS. 1 and 5).

An intermediate tank 61 included in the supply section 17 is provided on a −Z direction side of the attachment portion 12. In the present embodiment, four intermediate tanks 61A, 61B, 61C, and 61D are provided as the intermediate tank 61. The intermediate tanks 61A, 61B, 61C, and 61D are provided on the left side surface 2L side with respect to the center of the main body 2. The intermediate tanks 61A, 61B, 61C, and 61D are provided on the −Z direction side below the liquid containers 10A, 10B, 10C, and 10D attached to the attachment portion 12.

The intermediate tanks 61A, 61B, 61C, and 61D are provided at positions between the head 51 and the left side surface 2L in the X-axis direction. The X-axis direction is an example of the horizontal direction. The intermediate tanks 61A, 61B, 61C, and 61D are positioned lower than the head 51, that is, the intermediate tanks 61A, 61B, 61C, and 61D are positioned more toward the −Z direction than the head 51 is. The intermediate tank 61 is an example of a storage portion RS.

The liquid containers 10A, 10B, 10C, and 10D attached to the attachment portion 12 are coupled to the intermediate tanks 61A, 61B, 61C, and 61D, respectively. The inks in the liquid containers 10A, 10B, 10C, and 10D attached to the attachment portion 12 are supplied to the intermediate tanks 61A, 61B, 61C, and 61D, respectively.

The inks supplied from the liquid containers 10A, 10B, 10C, and 10D are stored in the intermediate tanks 61A, 61B, 61C, and 61D, respectively. The intermediate tanks 61A, 61B, 61C, and 61D are coupled to the head 51 by a supply channel 67 (see FIG. 6). Therefore, the inks stored in the intermediate tanks 61A, 61B, 61C, and 61D are supplied to the head 51.

The receiving portion 87 and a waste liquid storage portion 88 are provided on a −X direction side of the attachment portion 12. The receiving portion 87 receives the ink discharged from the head 51 during maintenance of the head 51. The receiving portion 87 is movable between a maintenance position illustrated in FIG. 4 and a separated position illustrated in FIG. 3. The waste liquid storage portion 88 is positioned on the −Z direction side below the receiving portion 87. Further, the waste liquid storage portion 88 is provided at a position between the receiving portion 87 and the left side surface 2L in the X-axis direction. The waste liquid storage portion 88 stores the ink discharged as waste liquid from the head 51. The waste liquid storage portion 88 is coupled to the receiving portion 87 through a waste liquid tube 89. The ink received by the receiving portion 87 is stored in the waste liquid storage portion 88 via the waste liquid tube 89.

The transport belt 13 is an endless belt that is wound around a pulley 14 and a pulley 15, and rotates when at least one of the pulley 14 or the pulley 15 is driven by a motor (not illustrated). A charging roller (not illustrated) is provided at a position facing the pulley 14 with the transport belt 13 in between. The charging roller is in contact with an outer surface of the transport belt 13 and rotates as the transport belt 13 rotates.

A DC voltage is applied to the charging roller from a high voltage unit 93 (see FIG. 5) described below, so that the charging roller supplies an electric charge to a portion that is in contact with the transport belt 13. For example, the charging roller supplies a positive electric charge to the transport belt 13 to charge the outer surface of the transport belt 13 positively. Thereby, the outer surface of the transport belt 13 becomes an adhesive surface onto which the medium P adheres. The medium P is transported to a position facing the head 51 while adhering to a belt surface of the transport belt 13. An adhesive method such as air suction may be employed for adhesion of the medium P to the transport belt 13.

The recording transport path T1 passing through the position facing the head 51 is inclined with respect to both the X-axis direction and the Z-axis direction, so that the medium P is transported upward. In other words, the recording transport path T1 is neither parallel to the Z-axis direction nor perpendicular to the Z-axis direction. This upward transport direction is a direction including a −X direction component and a +Z direction component in FIG. 3, and with such a configuration, the dimension of the printer 1 in the X axis direction can be reduced.

In the present embodiment, the recording transport path T1 is set to have an inclination angle in a range of 35° to 5° with respect to the Z-axis direction, that is, the device height direction, and more specifically, an inclination angle of 15°. Therefore, the head unit 50 is positioned between the liquid container 10, the attachment portion 12, and the intermediate tank 61, and the recording transport path T1 in the X-axis direction.

The discharge tray 8 is positioned more toward the +Z direction than the head unit 50 is. The discharge tray 8 forms a support surface 8*b* that supports the medium P discharged from the medium transport path. The support surface 8*b* extends in the V-axis direction, which is the movement direction of the head unit 50. As a result, no wasted space is formed between the discharge tray 8 and a movement region of the head unit 50, and it is possible to suppress an increase in size of the printer 1.

The medium P having a first surface on which recording was performed by the head 51 is further transported upward by the transport roller pair 32 positioned downstream of the transport belt 13. A flap 41 is provided downstream of the transport roller pair 32, and the transport direction of the medium P is switched by the flap 41. When the medium P is to be discharged as it is, the transport path of the medium P is switched by the flap 41 in such a way that the medium P is transported toward a transport roller pair 35 provided above. Thereby, the medium P is discharged toward the discharge tray 8 by the transport roller pair 35.

When recording is performed on a second surface of the medium P in addition to the first surface, the transport direction of the medium P is switched to a direction toward a branch position K1 by the flap 41. The medium P then passes through the branch position K1 and enters a switchback path T2. In the present embodiment, the switchback path T2 is a medium transport path above the branch position K1. Transport roller pairs 36 and 37 are provided in the switchback path T2. The medium P that entered the switchback path T2 is transported upward by the transport roller pairs 36 and 37, and once a lower edge of the medium P passes the branch position K1, a rotation direction of the transport roller pairs 36 and 37 is switched. Thereby, the medium P is transported downward.

An inversion path T3 is coupled to the switchback path T2. In the present embodiment, the inversion path T3 is a medium transport path that extends from the branch position K1, passes through transport roller pairs 33 and 34, and reaches the transport roller pair 38. The medium P transported downward from the branch position K1 receives a feeding force from the transport roller pairs 33 and 34, reaches the transport roller pair 38, is bent and inverted, and is fed to the transport roller pair 31.

The second surface of the medium P fed to the position facing the head 51 again faces the head 51, the second surface being opposite to the first surface on which recording was already performed. Therefore, the head 51 can perform recording on the second surface of the medium P.

Figure 5:
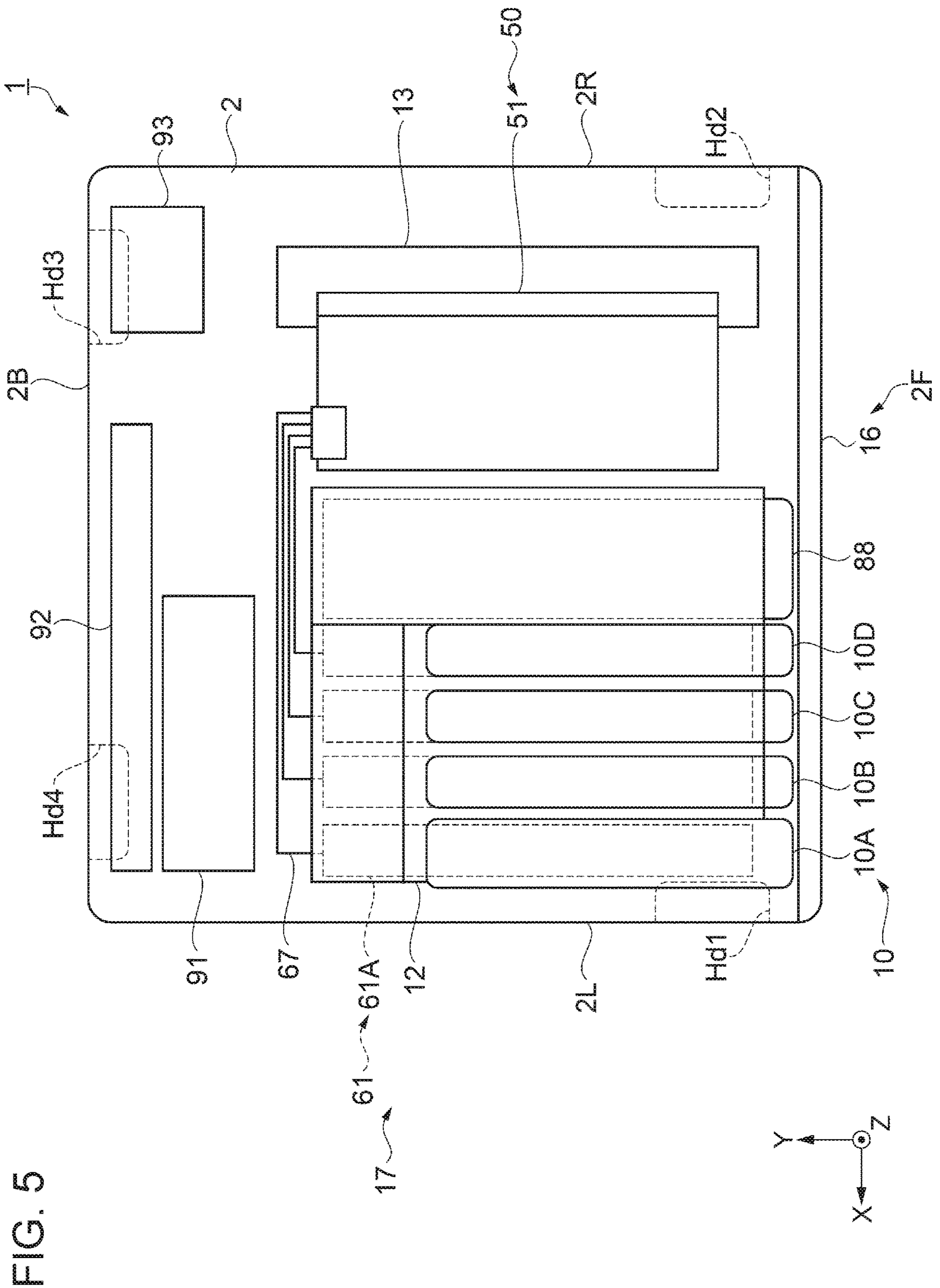
FIG. 5 is a schematic plan view illustrating a configuration of the main body of the printer.

Next, an electrical component included in the main body 2 will be described. As illustrated in FIG. 5, the main body 2 includes a power supply unit 91, a control unit 92, and the high voltage unit 93. The power supply unit 91 adjusts a voltage of power supplied to each component of the printer 1. The control unit 92 controls the printer 1 as a whole.

The control unit 92 includes a central processing unit (CPU) (not illustrated) and a storage unit (not illustrated). The CPU can execute various programs stored in the storage unit and can perform various types of determination and issue various commands. The storage unit stores various programs such as a program for controlling the transport of the medium P when performing recording on the medium P and controlling ejection by the head unit 50, various tables, and the like.

The power supply unit 91 and the control unit 92 are provided at positions between the intermediate tank 61 and the waste liquid storage portion 88, and the rear side surface 2B in the Y-axis direction. Further, the control unit 92 is provided at a position between the power supply unit 91 and the rear side surface 2B in the Y-axis direction. The high voltage unit 93 is provided at a position between the transport belt 13 and the rear side surface 2B in the Y-axis direction. Further, the high voltage unit 93 is provided at a position between the control unit 92 and the right side surface 2R in the X-axis direction.

Next, a handle portion Hd will be described. The printer 1 includes a plurality of handles Hd to be gripped when holding the main body 2. In the present embodiment, the handle portion Hd is a rectangular depression provided in a side surface of the main body 2. The handle portion Hd may also be a protrusion provided on a side surface of the main body 2 as long as the handle portion Hd can be gripped. Alternatively, the handle portion Hd may have a handle shape provided on an opening side of a rectangular depression. In the present embodiment, four handle portions Hd, that is, a first handle portion Hd1, a second handle portion Hd2, a third handle portion Hd3, and a fourth handle portion Hd4, are provided in the main body 2 as illustrated in FIGS. 1 to 5.

As illustrated in FIG. 1, the first handle portion Hd1 is provided in the left side surface 2L of the main body 2 at a position on the −Z direction side with respect to the center of the left side surface 2L. Further, the first handle portion Hd1 is provided in the left side surface 2L of the main body 2 at a position on a −Y direction side with respect to the center of the left side surface 2L. As illustrated in FIG. 3, the first handle portion Hd1 is provided at a position on the −Z direction side with respect to the center CG of gravity of the main body 2.

As illustrated in FIG. 2, the second handle portion Hd2 is provided in the right side surface 2R of the main body 2 at a position on the −Z direction side with respect to the center of the right side surface 2R. Further, the second handle portion Hd2 is provided in the right side surface 2R of the main body 2 at a position on the −Y direction side with respect to the center of the right side surface 2R. The second handle portion Hd2 is provided at a lower end of the right side surface 2R. As illustrated in FIG. 5, the positions of the second handle portion Hd2 and the first handle portion Hd1 in the Y-axis direction are the same as each other.

As illustrated in FIG. 3, the second handle portion Hd2 is provided at a position on the −Z direction side with respect to the first handle portion Hd1. Therefore, when viewed from a direction along the Y-axis direction, a straight line connecting the first handle portion Hd1 and the second handle portion Hd2 (indicated by a line with alternating long and two short dashes in FIG. 3) intersects the horizontal direction and forms an angle β with the horizontal direction. The direction along the Y-axis direction is orthogonal to the −V direction. In the present embodiment, the angle β is set to be smaller than the angle α. The angle β is an example of a second angle.

As illustrated in FIG. 2, the third handle portion Hd3 is provided in the rear side surface 2B of the main body 2 at a position on the −Z direction side with respect to the center of the rear side surface 2B. Further, the third handle portion Hd3 is provided in the rear side surface 2B of the main body 2 at a position on the −X direction side with respect to the center of the rear side surface 2B. The third handle portion Hd3 is provided at a lower end of the rear side surface 2B. Therefore, the positions of the third handle portion Hd3 and the second handle portion Hd2 in the Z-axis direction are the same as each other.

The fourth handle portion Hd4 is provided in the rear side surface 2B of the main body 2 at a position on the −Z direction side with respect to the center of the rear side surface 2B. Further, the fourth handle portion Hd4 is provided in the rear side surface 2B of the main body 2 at a position on a +X direction side with respect to the center of the rear side surface 2B. The fourth handle portion Hd4 is provided at the lower end of the rear side surface 2B. Therefore, the positions of the fourth handle portion Hd4 and the second handle portion Hd2 in the Z-axis direction are the same as each other.

In the present embodiment, for example, a plurality of operators lift the main body 2 from the mounting surface G or the expansion unit 6 by gripping a plurality of handle portions Hd including the first handle portion Hd1. In the present embodiment, the first handle portion Hd1 is provided at a position on the +Z direction side with respect to other handle portions Hd. In this case, as the plurality of handle portions Hd are gripped, the lifted main body 2 in a transportation posture is in an inclined posture in which the center of the left side surface 2L is lower than the center of the right side surface 2R unlike a normal posture.

In this case, the position of the intermediate tank 61 with respect to the head 51 in the transportation posture in the Z-axis direction is on the −Z direction side of the position of the intermediate tank 61 with respect to the head 51 in the normal posture. The normal posture of the main body 2 is a posture when the main body 2 is mounted on the mounting surface G or the expansion unit 6.

The movement direction of the head unit 50 including the head 51 is the V-axis direction. Therefore, a direction in which the head unit 50 in the normal posture tries to move by its own weight is the −V direction. In the present embodiment, the angle β is smaller than the angle α. Therefore, a direction in which the head unit 50 in the transportation posture tries to move by its own weight is the −V direction.

In the present embodiment, the handle portion Hd is provided at a position on the −Z direction side with respect to the head unit 50 and the receiving portion 87, which are movable portions.

Figure 7:
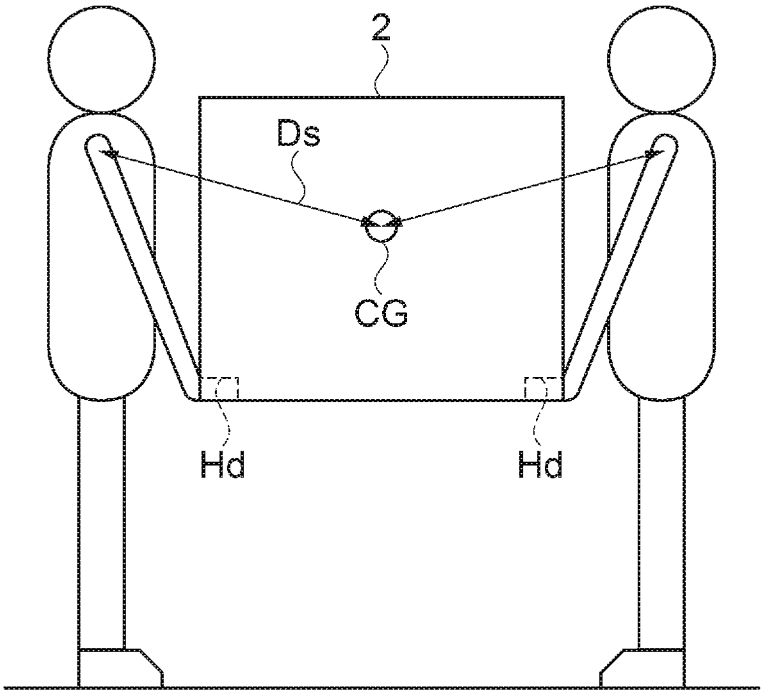
FIG. 7 is a schematic view illustrating a state of the printer when the main body is lifted.
Figure 8:
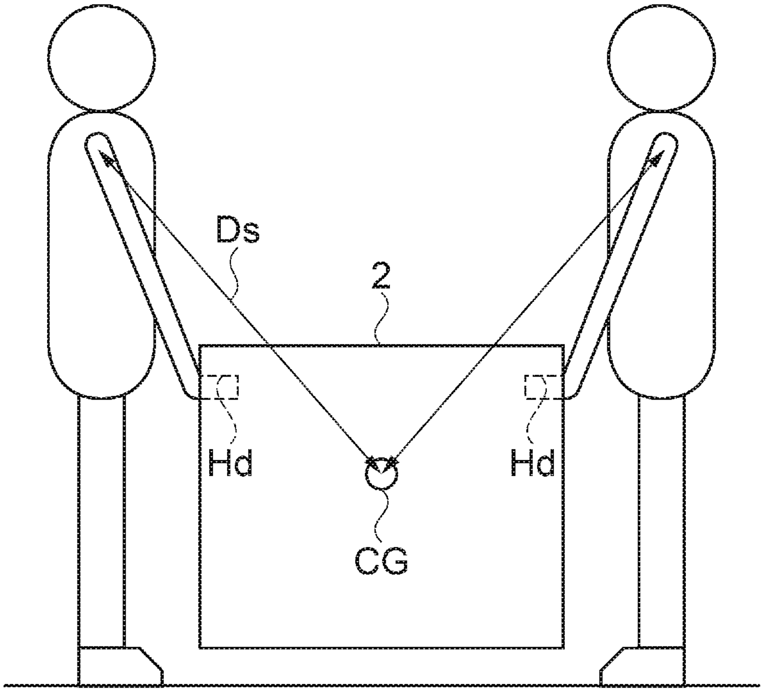
FIG. 8 is a schematic view illustrating a state of the printer when the main body is lifted.

In the present embodiment, the handle portion Hd is provided at a position on the −Z direction side with respect to the center CG of gravity of the main body 2. FIG. 7 illustrates a state in which the operators lift the main body 2 by gripping the handle portions Hd provided at positions on the −Z direction side with respect to the center CG of gravity of the main body 2. FIG. 8 illustrates a state in which the operators lift the main body 2 by gripping the handle portions Hd provided at positions on the +Z direction side with respect to the center CG of gravity of the main body 2.

As illustrated in FIGS. 7 and 8, a distance from a base of an arm of the operator to the center CG of gravity of the main body 2 when the main body 2 is being lifted is defined as a distance Ds. In this case, the distance Ds is smaller when the handle portions Hd are on the −Z direction side of the center CG of gravity than when the handle portions Hd are on the +Z direction side of the center CG of gravity. Therefore, according to the present embodiment, when lifting the main body 2 by gripping the handle portion Hd, it is possible to suppress shaking of the main body 2. Furthermore, according to the present embodiment, when lifting the main body 2 by gripping the handle portion Hd, movement of the movable portions such as the head unit 50 and the receiving portion 87 can be suppressed.

In the present embodiment, the handle portion Hd is provided at a position on the −Z direction side with respect to the front cover 16 and the opening/closing portion 9A of the scanner unit 9. Further, the first handle portion Hd1 is provided closer to the front side surface 2F where the front cover 16 is provided. With this configuration, when the operator is lifting the main body 2 by gripping the handle portion Hd, the operator can easily prevent the front cover 16 and the opening/closing portion 9A from being opened with his/her body. Further, it is possible to prevent the opening/closing portion 9A from being opened due to tilting of the main body 2 when lifting the main body 2 by gripping the handle portion Hd.

Further, in the present embodiment, the second handle portion Hd2 is provided at a position on the −Z direction side with respect to the medium cassette 3. The second handle portion Hd2 is provided closer to the front side surface 2F where the medium cassette 3 is provided. With this configuration, when the operator is lifting the main body 2 by gripping the handle portion Hd, the operator can easily prevent the medium cassette 3 from being opened with his/her body.

In the present embodiment, the first handle portion Hd1 is provided at a position on the −Z direction side with respect to the discharge tray 8. With this configuration, when the operator is lifting the main body 2 by gripping the handle portion Hd, the operator can easily prevent the medium P mounted on the discharge tray 8 from falling with his/her body including the arms.

The relatively heavy power supply unit 91 of the main body 2 is provided at a position closer to the fourth handle portion Hd4 than to the first handle portion Hd1. Further, the relatively heavy head unit 50 of the main body 2 is provided at a position closer to the second handle portion Hd2 and the third handle portion Hd3 than to the first handle portion Hd1. With this configuration, it is possible to stably lift the main body 2 by gripping the second handle portion Hd2, the third handle portion Hd3, and the fourth handle portion Hd4 provided on the −Z direction side with respect to the first handle portion Hd1.

Next, a configuration of the supply section 17 including the intermediate tank 61 will be described with reference to FIG. 6. The configurations of the intermediate tanks 61A, 61B, 61C, and 61D are the same as the configuration of the intermediate tank 61 illustrated in FIG. 6. Further, the configurations of the liquid containers 10A, 10B, 10C, and 10D are the same as the configuration of the liquid container 10 illustrated in FIG. 6.

The supply section 17 includes the intermediate tank 61, the supply channel 67 that supplies the ink from the intermediate tank 61 to the head 51, a return channel 73 that returns the ink from the head 51 to the intermediate tank 61, and a flow mechanism 78 that causes the ink to flow. The supply channel 67 and the return channel 73 are formed using flexible resin tubes, for example.

The intermediate tank 61 is configured to allow introduction of the ink supplied from the liquid container 10 and discharge of the ink toward the head 51. The intermediate tank 61 includes a first introduction portion 60, a storage chamber 62, a storage chamber 63, and a discharge channel 71 through which the storage chamber 62 and the storage chamber 63 communicate with each other. An opening/closing valve 72 is provided in the middle of the discharge channel 71.

The storage chamber 62 is positioned upstream of the storage chamber 63 in a liquid flow direction when the ink is supplied from the liquid container 10 to the head 51. The storage chamber 62 functions as a sub-tank that temporarily stores the ink introduced from the liquid container 10. The storage chamber 63 functions as a reservoir tank that temporarily stores the ink discharged from the storage chamber 62 until the ink is supplied to the head 51.

The ink introduced from the liquid container 10 attached to the attachment portion 12 is stored in the storage chamber 62. When the ink in the storage chamber 63 is consumed as a result of being supplied to the head 51, the opening/closing valve 72 is opened. As a result, ink is replenished from the storage chamber 62 to the storage chamber 63 through the discharge channel 71. The opening/closing valve 72 is a one-way valve. The opening/closing valve 72, which is a one-way valve, allows the ink to flow from the storage chamber 62 toward the storage chamber 63 in a discharge direction, and prevents the ink from flowing from the storage chamber 63 toward the storage chamber 62. The opening/closing valve 72 may be controlled by the control unit 92, but in the present embodiment, the opening/closing valve 72 is implemented by a differential pressure valve that is opened and closed based on a differential head.

Figure 6:
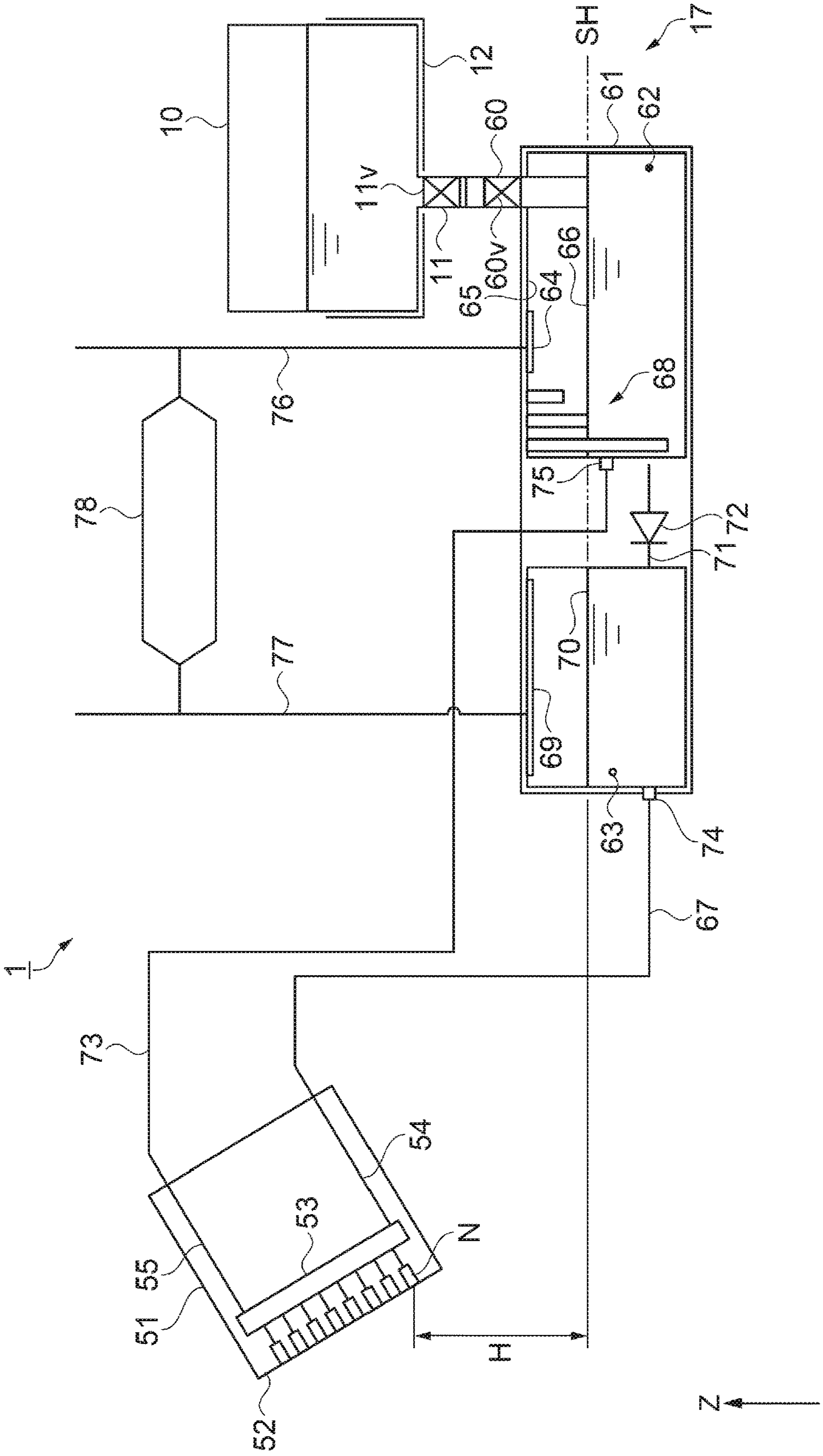
FIG. 6 is a schematic diagram illustrating a configuration of a supply section of the printer.

As illustrated in FIG. 6, the intermediate tank 61 includes an atmosphere opening portion 64, an atmosphere opening portion 69, a communication pipe 76, and a communication pipe 77. The atmosphere opening portion 64 is configured to be able to open the inside of the storage chamber 62 to the atmosphere via the communication pipe 76. The atmosphere opening portion 64 is provided in a space above a liquid surface 66 which is a liquid surface of the ink stored in the storage chamber 62. The atmosphere opening portion 69 is configured to be able to open the storage chamber 63 to the atmosphere via the communication pipe 77. The atmosphere opening portion 69 is provided in a space above a liquid surface 70 that is a liquid surface of the ink stored in the storage chamber 63.

The communication pipe 76 may be configured to be switchable between an atmosphere open state in which the inside of the storage chamber 62 is opened to the atmosphere and a non-atmosphere open state in which the inside of the storage chamber 62 is not opened to the atmosphere. The communication pipe 77 may be configured to be switchable between an atmosphere open state in which the inside of the storage chamber 63 is opened to the atmosphere, and a non-atmosphere open state in which the inside of the storage chamber 63 is not opened to the atmosphere.

The ink contained in the liquid container 10 is discharged through a dispensing portion 11. The dispensing portion 11 includes a discharge valve 11*v*. The inside of the liquid container 10 is a closed space that does not communicate with the atmosphere. Furthermore, the liquid container 10 is formed of a material that does not have flexibility. The liquid container 10 before being attached to the attachment portion 12 may contain a larger amount of ink than the amount of ink that the intermediate tank 61 can hold.

Next, the storage chamber 62 will be described. The first introduction portion 60, a liquid surface detection portion 68, the atmosphere opening portion 64, the communication pipe 76, and a second introduction portion 75 coupled to one end of the return channel 73 are provided at the storage chamber 62. The first introduction portion 60 includes an introduction valve 60*v*.

When the liquid container 10 is attached to the attachment portion 12, the dispensing portion 11 and the first introduction portion 60 are coupled to each other, and the discharge valve 11*v* and the introduction valve 60*v* are opened. When the liquid container 10 is attached to the attachment portion 12, the discharge valve 11*v* and the introduction valve 60*v* are kept open. In a process of attaching the liquid container 10 to the attachment portion 12, the introduction valve 60*v* may be opened before the discharge valve 11*v* is opened. As a result, leakage of the ink from the liquid container 10 is suppressed.

The first introduction portion 60 introduces the ink supplied from the liquid container 10. The first introduction portion 60 is disposed on the storage chamber 62. The first introduction portion 60 penetrates through a ceiling 65 of the storage chamber 62. A lower end of the first introduction portion 60 is disposed inside the storage chamber 62 and is positioned on the −Z direction side below the ceiling 65. An upper end of the first introduction portion 60 is disposed outside the storage chamber 62 and positioned on the +Z direction side above the ceiling 65.

The storage chamber 62 stores the ink introduced from the first introduction portion 60. The storage chamber 62 is positioned lower than the head 51, that is, the storage chamber 62 is positioned on the −Z direction side with respect to the head 51. Therefore, the lower end of the first introduction portion 60 is positioned lower than a nozzle surface 52 of the head 51 and the nozzles N. Therefore, the liquid surface 66 of the ink stored in the storage chamber 62 fluctuates in a low range lower than the nozzle surface 52 and the nozzle N. The ink in the liquid container 10 flows into the storage chamber 62 via the dispensing portion 11 and the first introduction portion 60 due to a differential head with the ink in the storage chamber 62. The differential head is a difference between the water head of the ink in the liquid container 10 corresponding to the position of the lower end of the first introduction portion 60 in the direction of gravity, and the water head of the ink in the storage chamber 62 corresponding to the position of the liquid surface 66 in the direction of gravity.

The communication pipe 76 is configured to be able to open the inside of the storage chamber 62 to the atmosphere via the atmosphere opening portion 64. The communication pipe 76 is, for example, a thin pipe extending from the storage chamber 62 to a position on the +Z direction side of the head 51 in the Z-axis direction. The atmosphere opening portion 64 is implemented by, for example, a gas-liquid separation membrane. The gas-liquid separation membrane is a membrane material that is permeable to gas but impermeable to liquid.

The atmosphere opening portion 64 prevents the ink in the storage chamber 62 from leaking to the outside, while the communication pipe 76 allows air to flow in and out between the storage chamber 62 and the outside. As described above, since the storage chamber 62 is opened to the atmosphere, the liquid surface 66 changes as the ink is introduced from the liquid container 10 through the first introduction portion 60 and is discharged through the discharge channel 71.

When the ink in the liquid container 10 has flowed into the storage chamber 62 via the dispensing portion 11 and the first introduction portion 60, an amount of air corresponding to the amount of the ink that has flowed into the storage chamber 62 flows from the lower end of the first introduction portion 60 to the liquid container 10 via the first introduction portion 60 and the dispensing portion 11. At the same time, the liquid surface 66 rises by the amount of the ink that has flowed in. Once the rising liquid surface 66 reaches the lower end of the first introduction portion 60, air stops flowing from the storage chamber 62 into the liquid container 10. When the water head of the ink in the liquid container 10 becomes the same level as the water head of the ink in the storage chamber 62, the ink stops flowing from the liquid container 10 into the storage chamber 62.

When the ink flows from the storage chamber 62 to the storage chamber 63, the liquid surface 66 falls. When the falling liquid surface 66 becomes lower than the lower end of the first introduction portion 60, the water head of the ink in the liquid container 10 becomes higher than the water head of the ink in the storage chamber 62. Therefore, the ink in the liquid container 10 flows into the storage chamber 62. As a result, while there is ink in the liquid container 10, the liquid surface 66 is maintained at a standard position SH (indicated by a line with alternating long and two short dashes in FIG. 6), which is the position of the lower end of the first introduction portion 60. When the ink in the liquid container 10 runs out, the liquid surface 66 moves below the standard position SH.

The intermediate tank 61 further includes the liquid surface detection portion 68 that can detect the liquid surface 66 of the ink in the storage chamber 62. The liquid surface detection portion 68 detects that the liquid surface 66 is positioned at the standard position SH, that the liquid surface 66 is positioned below the standard position SH, and that the liquid surface 66 is positioned at a full position. The full position is a position above the standard position SH. When the liquid surface 66 is positioned at the full position, the storage chamber 62 stores the maximum amount of ink. When the liquid surface detection portion 68 detects that the liquid surface 66 is positioned below the standard position SH, the control unit 92 determines that the liquid container 10 is empty and notifies the operator that the liquid container 10 is to be replaced through the display portion 7A (see FIG. 1).

Next, the storage chamber 63 will be described. The storage chamber 63 is positioned lower than the head 51, that is, the storage chamber 62 is positioned on the −Z direction side with respect to the head 51. Therefore, the liquid surface 70 of the ink in the storage chamber 63 is positioned lower than the nozzle surface 52 of the head 51 and the nozzles N. The storage chamber 63 is coupled to the other end of the discharge channel 71 and stores the ink supplied from the storage chamber 62. The storage chamber 63 is coupled to a head channel 54 of the head 51 by the supply channel 67. The atmosphere opening portion 69, the communication pipe 77, and a discharge portion 74 coupled to one end of the supply channel 67 are provided at the storage chamber 63.

The communication pipe 77 is configured to be able to open the inside of the storage chamber 63 to the atmosphere via the atmosphere opening portion 69. The communication pipe 77 is, for example, a thin pipe extending from the storage chamber 63 to a position on the +Z direction side of the head 51 in the Z-axis direction. The atmosphere opening portion 69 is implemented by, for example, a gas-liquid separation membrane. Similarly to the gas-liquid separation membrane implementing the atmosphere opening portion 64, the gas-liquid separation membrane is a membrane that is permeable to gas but impermeable to liquid.

The ink in the storage chamber 62 flows into the storage chamber 63 due to the differential head between the ink in the storage chamber 62 and the ink in the storage chamber 63. When a pressure in the storage chamber 62 and a pressure the storage chamber 63 are the atmospheric pressure, the liquid surface 70 of the ink stored in the storage chamber 63 is at the same level as the liquid surface 66 in the Z-axis direction.

In other words, the liquid surface 70 is maintained at the standard position SH, which corresponds to the height of the lower end of the first introduction portion 60, and fluctuates in a low range below the nozzle surface 52 and the nozzles N. The ink in the head 51 is maintained at a negative pressure due to the differential head between the ink in the storage chamber 62 and the ink in the storage chamber 63. When the ink is consumed in the head 51, the ink stored in the storage chamber 63 is supplied to the head 51 via the supply channel 67.

The storage chambers 62 and 63 of the intermediate tank 61 are provided at positions below the nozzles N that are opened in the nozzle surface 52 of the head 51. More specifically, the liquid surfaces 66 and 70 of the storage chambers 62 and 63 are positioned below a gas-liquid interface formed in the nozzles N. The storage chambers 62 and 63 of the intermediate tank 61 are opened to the atmosphere via the atmosphere opening portions 64 and 69 and the communication pipes 76 and 77. As a result, the atmospheric pressure is applied to the ink stored in the storage chambers 62 and 63 via the liquid surfaces 66 and 70. Therefore, the ink in the head 51 is maintained at a negative pressure due to the differential head between the ink in the storage chamber 62 and the ink in the storage chamber 63.

As the intermediate tank 61 is arranged at a position where the standard position SH of the liquid surfaces 66 and 70 is lower than the air-liquid interface formed in the nozzles N by a height difference H, a pressure of the ink supplied to the head 51 can be adjusted to a predetermined negative pressure. The predetermined negative pressure is a pressure that does not break the gas-liquid interface formed in the nozzles N, and is preferably from −10 kPa to −3500 Pa in terms of gauge pressure, more preferably from −500 Pa to −2000 Pa in terms of gauge pressure. Further, when the predetermined negative pressure is −500 Pa to −2000 Pa in terms of gauge pressure, the height difference H corresponds to 50 mm to 200 mm.

Next, the return channel 73 and the flow mechanism 78 will be described. The supply section 17 of the present embodiment includes the return channel 73 that couples the second introduction portion 75 of the storage chamber 62 and a head channel 55 of the head 51 to each other. Therefore, the storage chamber 62, the discharge channel 71, the storage chamber 63, the supply channel 67, the head channel 54, a common liquid chamber 53, the head channel 55, and the return channel 73 form an annular circulation channel. The common liquid chamber 53 of the head 51 is coupled to the head channels 54 and 55. Further, the common liquid chamber 53 communicates with the plurality of nozzles N, and the ink in the intermediate tank 61 is supplied to the plurality of nozzles N via the common liquid chamber 53.

The flow mechanism 78 is coupled to the communication pipes 76 and 77. The flow mechanism 78 circulates the ink in the circulation channel by generating a pressure difference between a pressure applied to the ink in the storage chamber 62 and a pressure applied to the ink in the storage chamber 63. The flow mechanism 78 includes a control valve that can cut off communication of any one of the communication pipes 76 and 77 with an external space, and a pump that can send air to the storage chamber 63. As the pump, a tube pump in which a roller rotates around an axis while squeezing the tube, a diaphragm pump in which air is sucked and discharged by changing the volume of a pump chamber provided in the middle of the channel, or the like can be employed. Further, the flow mechanism 78 may include a pressure sensor that can detect the pressure in the storage chambers 62 and 63 via the communication pipes 76 and 77.

For example, it is assumed that the control unit 92 drives and controls the pump of the flow mechanism 78 to send air into the storage chamber 63 to make the pressure in the storage chamber 63 higher than the pressure in the storage chamber 62. In this case, the opening/closing valve 72 prevents the ink from flowing from the storage chamber 63 toward the storage chamber 62 in the discharge channel 71. As a result, the ink in the circulation channel flows from the storage chamber 63 to the head 51 in the supply channel 67 and from the head 51 to the storage chamber 62 in the return channel 73.

When causing the ink in the circulation channel to flow, the control unit 92 may drive and control the pump of the flow mechanism 78 based on the pressure in the storage chamber 63 detected by the pressure sensor. Thereby, the control unit 92 increases the pressure in the storage chamber 63 to the extent that the ink in the common liquid chamber 53 of the head 51 has a negative pressure with respect to the ink in the nozzles N.

In the present embodiment, the ink can be supplied to the head 51 from the storage chambers 62 and 63 of the intermediate tank 61 via the supply channel 67 and the return channel 73. When any one of the supply channel 67 or the return channel 73 is selected to supply the ink to the head 51, a control valve that can cut off communication of the supply channel 67 and communication of the return channel 73 may be provided in the supply channel 67 and the return channel 73.

Further, when there is no need to circulate the ink in the circulation channel, the supply section 17 does not need to include the return channel 73 and the flow mechanism 78. Furthermore, when there is no need to circulate the ink in the circulation channel, the head 51 does not have to include the head channel 55. When there is no need to circulate the ink in the circulation channel, the intermediate tank 61 does not have to include the storage chamber 63, the discharge channel 71, the opening/closing valve 72, and the second introduction portion 75 of the storage chamber 62. In this case, the supply channel 67 couples the head channel 54 of the head 51 and the storage chamber 62 of the intermediate tank 61 to each other.

As described above, with the printer 1 according to the first embodiment, the following effects can be obtained.

The printer 1 includes the head 51 that ejects the ink, the storage portion RS that stores the ink to be supplied to the head 51 and is coupled to the head 51, and the main body 2 that includes the head 51 and the storage portion RS. The printer 1 further includes the grippable first handle portion Hd1 provided in the left side surface 2L of the main body 2. The printer 1 further includes the grippable second handle portion Hd2 provided in the right side surface 2R of the main body 2, the right side surface 2R facing the left side surface 2L. The storage portion RS is provided between the head 51 and the left side surface 2L in the X-axis direction, and the first handle portion Hd1 is positioned higher than the second handle portion Hd2 in the direction of gravity. With this configuration, when lifting the main body 2 by gripping the first handle portion Hd1 and the second handle portion Hd2, the position of the storage portion RS with respect to the head 51 is positioned lower than the normal position, so that leakage of the ink from the head 51 can be suppressed.

The storage portion RS is positioned lower than the head 51 in the direction of gravity. With this configuration, the ink is less likely to leak from the head 51 compared to a case where the storage portion RS is positioned higher than the head 51. Further, it is not necessary to provide a differential pressure valve or the like in a channel coupling the storage portion RS and the head 51 to each other to maintain the pressure of the ink in the head 51 at a negative pressure.

The storage portion RS is opened to the atmosphere. With this configuration, the pressure of the ink to be supplied to the head 51 can be easily adjusted by using the differential head between the storage portion RS and the head 51.

The head 51 is provided on the right side surface 2R side with respect to the center of the main body 2, and the storage portion RS is provided on the left side surface 2L side with respect to the center of the main body 2. With this configuration, when lifting the main body 2, a swing range in which the storage portion RS swings around the first handle portion Hd1 can be suppressed. As a result, vibration of the ink inside the storage portion RS can be suppressed, so that leakage of the ink can be suppressed. In addition, a space within the main body 2 can be effectively utilized.

The head 51 ejects the ink in the −V direction that intersects the horizontal direction and the direction of gravity, and the right side surface 2R is provided in the −V direction. With this configuration, the transport direction of the medium P on which the ink is ejected can be made diagonal, a distance between the left side surface 2L and the right side surface 2R can be shortened. Thereby, the dimension of the printer 1 in a width direction can be reduced.

The head 51 can be displaced in the −V direction. When viewed from a direction orthogonal to the −V direction, the angle $\beta$ between the straight line connecting the first handle portion Hd1 and the second handle portion Hd2 and the horizontal direction is smaller than the angle $\alpha$ between the −V direction and the horizontal direction. When the angle $\beta$ is larger than the angle $\alpha$, a direction in which the head 51 tries to move by its own weight in the normal posture is opposite to a direction in which the head 51 tries to move by its own weight in the transportation posture. On the other hand, when the angle $\beta$ is made smaller than the angle $\alpha$, the direction in which the head 51 tries to move by its own weight in the normal posture and the direction in which the head 51 tries to move by its own weight in the transportation posture can be made the same. Therefore, according to the present embodiment, the movement of the head 51 can be suppressed when the main body 2 is transported. Further, there is no need to provide a member to restrict movement of the head 51 during transportation.

The printer 1 includes the waste liquid storage portion 88 provided in the main body 2, the waste liquid storage portion 88 storing the ink discharged from the head 51 and being coupled to the receiving portion 87 that receives the ink discharged from the head 51. The waste liquid storage portion 88 is provided at a position between the receiving portion 87 and the left side surface 2L in the X-axis direction. With this configuration, when lifting the main body 2 by gripping the first handle portion Hd1 and the second handle portion Hd2, it is possible to suppress the ink in the waste liquid storage portion 88 from leaking from the receiving portion 87.

The printer 1 includes the grippable third handle portion Hd3 provided in the rear side surface 2B of the main body 2, the rear side surface 2B intersecting the left side surface 2L and the right side surface 2R. The printer 1 further includes the grippable fourth handle portion Hd4 provided in the rear side surface 2B. The third handle portion Hd3 and the fourth handle portion Hd4 are positioned lower than the first handle portion Hd1 in the direction of gravity. With this configuration, even when lifting the main body 2 by gripping the first handle portion Hd1 and the plurality of handle portions Hd, the position of the storage portion RS with respect to the head 51 is lower than the normal position, so that leakage of the ink from the head 51 can be suppressed.

The second handle portion Hd2, the third handle portion Hd3, and the fourth handle portion Hd4 are provided at the same height in the direction of gravity. With this configuration, it is possible to stably transport the main body 2 by gripping the four handle portions Hd.

The printer 1 includes the display portion 7A that displays the setting screen of the main body 2 and protrudes from the front side surface 2F facing the rear side surface 2B. When the protruding display portion 7A is provided above the handle portion Hd, it is difficult for a carrier to grip the handle portion Hd during transportation. On the other hand, with this configuration, the display portion 7A is provided on a side surface different from a side surface in which the handle portion Hd is provided, so that the carrier can easily grip the handle portion Hd.

The first handle portion Hd1 is positioned lower than the center CG of gravity of the main body 2 in the direction of gravity. With this configuration, the distance Ds between the center CG of gravity of the main body 2 and the base of the arm when transporting the main body 2 by gripping the handle portion Hd is smaller than that in a case in which the handle portion Hd is positioned higher than the center CG of gravity of the main body 2. Therefore, vibration of the main body 2 during transportation can be suppressed.

Although the printer 1 according to the above-described embodiment of the present disclosure basically has the configuration described above, it is a matter of course that a partial configuration changes or omissions may be made without departing from the gist of the present disclosure. Further, the above-described embodiment and other embodiments described below can be implemented in combination within a technically consistent range. Hereinafter, the other embodiments will be described.

In the above-described embodiment, the printer 1 does not have to include the scanner unit 9 in the main body 2. Furthermore, the printer 1 does not have to include the expansion unit 6 that can be coupled to the main body 2.

In the above-described embodiment, the main body 2 does not have to be provided with four handle portions Hd. For example, the third handle portion Hd3 and the fourth handle portion Hd4 do not have to be provided. In this case, the first handle portion Hd1 may be provided in the left side surface 2L at a position closer to the center of the left side surface 2L than to the front side surface 2F in the Y-axis direction. Further, in this case, the second handle portion Hd2 may be provided in the right side surface 2R at a position closer to the center of the right side surface 2R than to the front side surface 2F in the Y-axis direction.

In the above-described embodiment, the third handle portion Hd3 and the fourth handle portion Hd4 do not have to be provided in the rear side surface 2B. For example, the third handle portion Hd3 may be provided in the rear side surface 2B, and the fourth handle portion Hd4 may be provided in the left side surface 2L. Further, for example, the third handle portion Hd3 may be provided in the right side surface 2R, and the fourth handle portion Hd4 may be provided in the rear side surface 2B. For example, the third handle portion Hd3 may be provided in the right side surface 2R, and the fourth handle portion Hd4 may be provided in the left side surface 2L. For example, the third handle portion Hd3 and the fourth handle portion Hd4 may be provided in the front side surface 2F.

In the above-described embodiment, the third handle portion Hd3 and the fourth handle portion Hd4 do not have to be provided at the same height as the second handle portion Hd2 in the Z-axis direction. Also in this case, when lifting the main body 2 by gripping the handle portion Hd, the position of the storage portion RS with respect to the head 51 needs to be lower than the normal position. For example, in this case, the fourth handle portion Hd4 may be provided at the same height as the first handle portion Hd1 in the Z-axis direction. Further, in this case, the fourth handle portion Hd4 may be provided in the left side surface 2L at a position closer to the rear side surface 2B than to the center of the left side surface 2L in the Y-axis direction.

Figure 9:
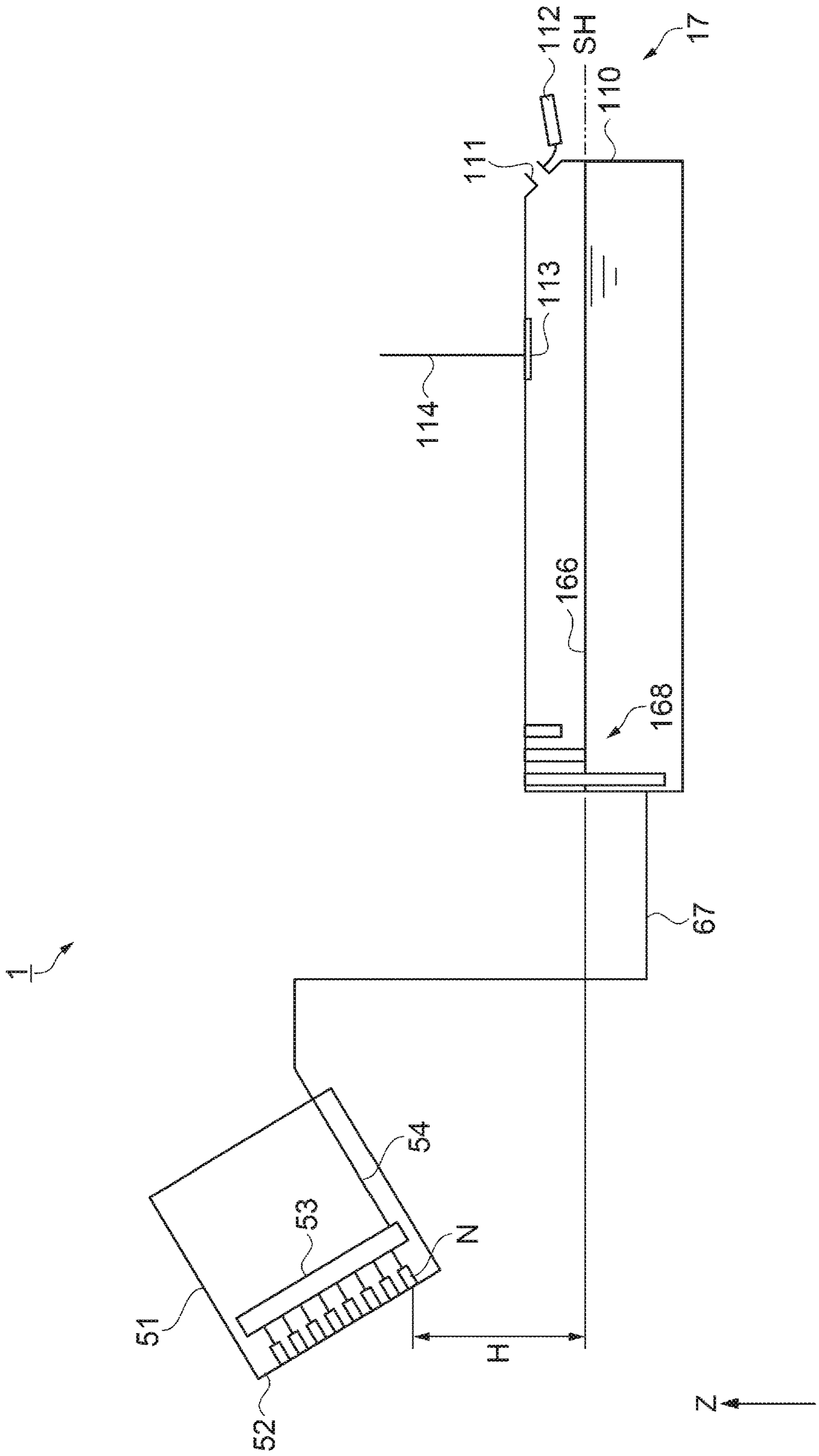
FIG. 9 is a schematic view illustrating another example of the supply section.

In the above-described embodiment, the supply section 17 does not have to include the attachment portion 12, the intermediate tank 61, the return channel 73, and the flow mechanism 78. For example, as illustrated in FIG. 9, a liquid tank 110 may be provided in the main body 2 instead of the liquid container 10 that can be attached to and detached from the attachment portion 12. The liquid tank 110 includes a pouring port 111 into which the ink can be poured, and a cap 112 that closes the pouring port 111. Further, the liquid tank 110 includes an atmosphere opening portion 113 similar to the atmosphere opening portion 64 of the first embodiment, and a communication pipe 114 similar to the communication pipe 76. As a result, the inside of the liquid tank 110 is opened to the atmosphere. Accordingly, the atmospheric pressure is applied to the ink stored in the liquid tank 110 via a liquid surface 166. Further, the liquid tank 110 includes a liquid surface detection portion 168 similar to the liquid surface detection portion 68 of the first embodiment.

The liquid tank 110 is coupled to the head channel 54 of the head 51 by the supply channel 67, similar to the intermediate tank 61 of the first embodiment. Thereby, the ink stored in the liquid tank 110 can be supplied to the head 51. The liquid tank 110 is an example of the storage portion RS. Similarly to the intermediate tank 61 of the first embodiment, the liquid tank 110 is provided at a position between the head 51 and the left side surface 2L in the X-axis direction. Similarly to the intermediate tank 61, the liquid tank 110 is provided on the −Z direction side below the head 51 in the Z-axis direction. With this configuration, when lifting the main body 2 by gripping the first handle portion Hd1 and the second handle portion Hd2, the position of the liquid tank 110 with respect to the head 51 is positioned lower than the normal position, so that leakage of the ink from the head 51 can be suppressed.

Further, the liquid surface 166 of the ink stored in the liquid tank 110 is maintained at the standard position SH, which is lower than the nozzles N of the head 51 by the height difference H, similarly to the intermediate tank 61. The control unit 92 determines that the liquid tank 110 needs to be refilled with the ink when the liquid surface detection portion 168 detects that the liquid surface 166 is positioned below the standard position SH. Then, the control unit 92 makes a notification to prompt pouring of the ink into the liquid tank 110 through the display portion 7A.

Figure 10:
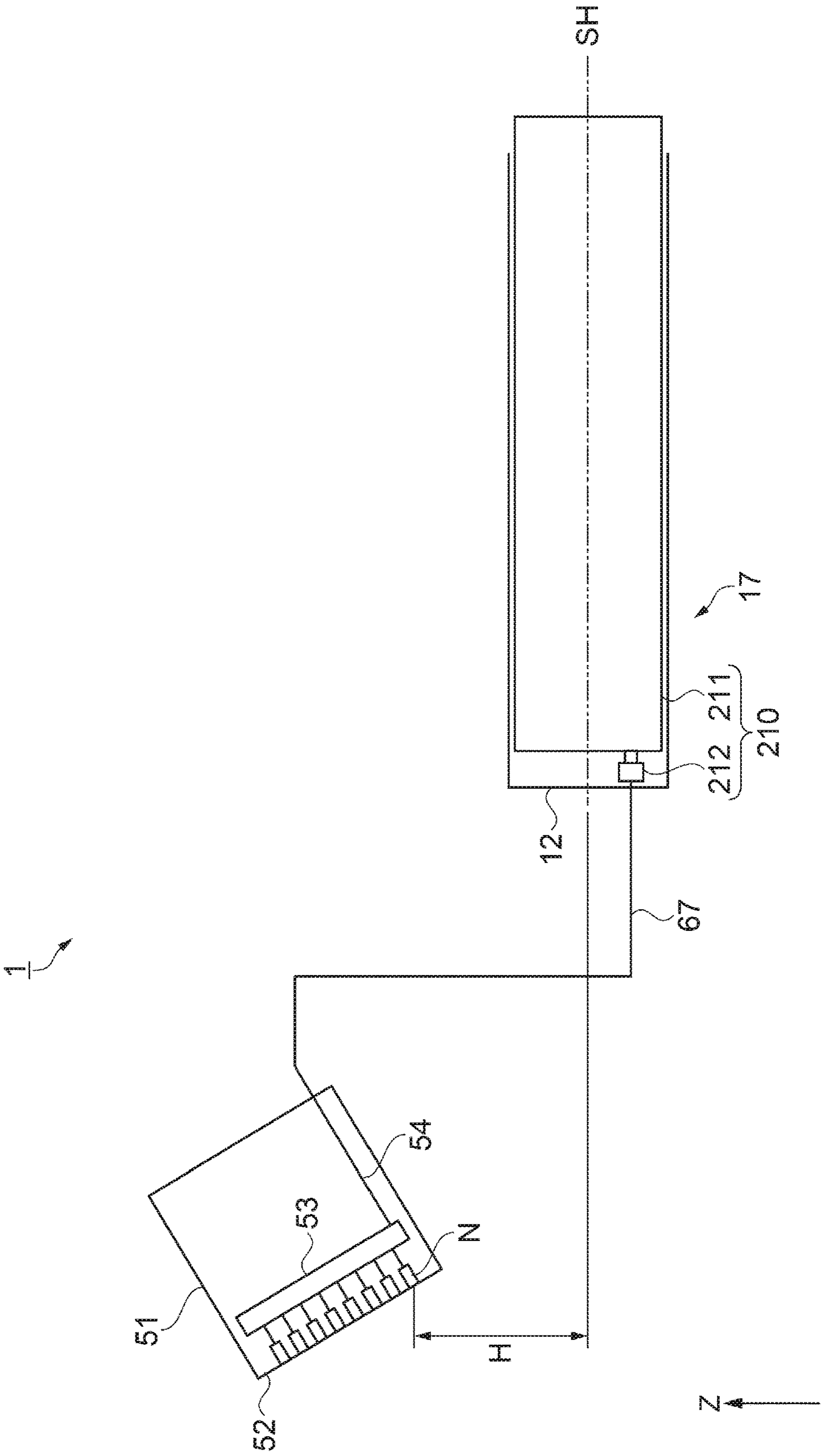
FIG. 10 is a schematic view illustrating another example of the supply section.

In the above-described embodiment, the liquid container 10 does not have to be attached to the attachment portion 12. For example, a detachable liquid storage bag 210 may be attached to the attachment portion 12 as illustrated in FIG. 10. In this case, the supply section 17 does not have to include the intermediate tank 61, the return channel 73, and the flow mechanism 78. The liquid storage bag 210 includes a bag body 211 that can contain the ink, and a discharge portion 212 that can discharge the ink stored in the bag body 211. The bag body 211 is formed using, for example, a flexible resin film. As a result, the atmospheric pressure is applied to the ink stored in the bag body 211 via the resin film.

The liquid storage bag 210 attached to the attachment portion 12 is coupled to the head channel 54 of the head 51 by coupling the discharge portion 212 to the supply channel 67. Thereby, the ink stored in the liquid storage bag 210 can be supplied to the head 51. The liquid storage bag 210 is an example of the storage portion RS. Similarly to the intermediate tank 61 of the first embodiment, the liquid storage bag 210 attached to the attachment portion 12 is provided at a position between the head 51 and the left side surface 2L in the X-axis direction. Similarly to the intermediate tank 61, the liquid storage bag 210 attached to the attachment portion 12 is provided on the −Z direction side below the head 51 in the Z-axis direction. With this configuration, when lifting the main body 2 by gripping the first handle portion Hd1 and the second handle portion Hd2, the position of the liquid storage bag 210 with respect to the head 51 is positioned lower than the normal position, so that leakage of the ink from the head 51 can be suppressed. When the liquid storage bag 210 is attached to the attachment portion 12, the position of the attachment portion 12 in the Z-axis direction is set in such a way that the center of the bag body 211 is positioned at the standard position SH, which is lower than the nozzles N of the head 51 by the height difference H.

Figure 11:
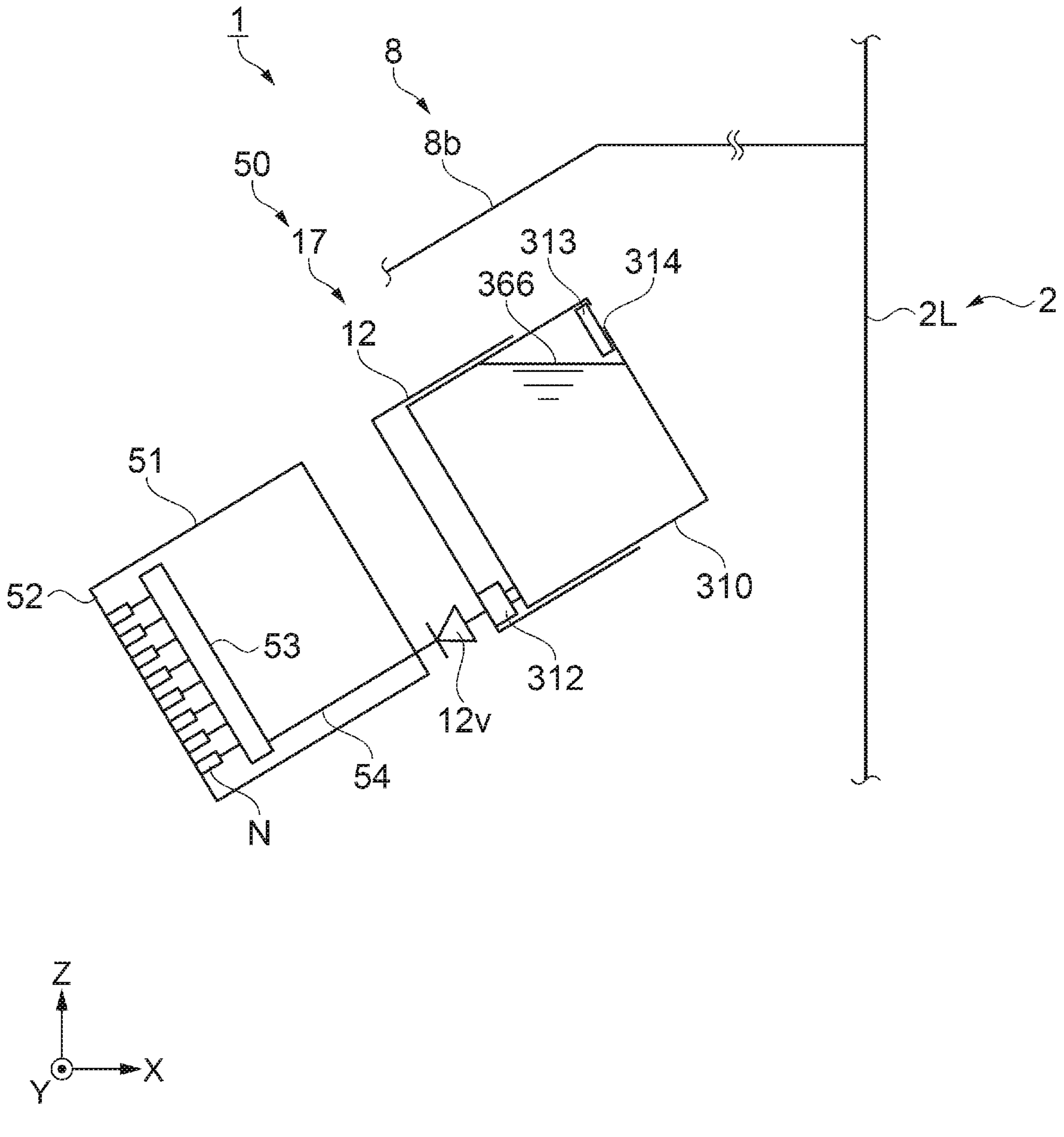
FIG. 11 is a schematic view illustrating another example of the supply section.

In the above-described embodiment, the liquid container 10 does not have to be attached to the attachment portion 12. For example, as illustrated in FIG. 11, the attachment portion 12 may be provided in the head unit 50, and a detachable head tank 310 may be attached to the attachment portion 12. In this case, the supply section 17 does not have to include the intermediate tank 61, the supply channel 67, the return channel 73, and the flow mechanism 78. The head tank 310 includes a discharge portion 312 and an atmosphere opening portion 313 similar to the atmosphere opening portion 64 of the first embodiment. Further, a communication hole 314 is provided in a wall of the head tank 310 to communicate the inside of the head tank with the atmosphere via the atmosphere opening portion 313. As a result, the inside of the head tank 310 is opened to the atmosphere. Accordingly, the atmospheric pressure is applied to the ink stored in the head tank 310 via a liquid surface 366 of the ink.

The head tank 310 attached to the attachment portion 12 is coupled to the head 51 by coupling the discharge portion 312 to the head channel 54. Thereby, the ink stored in the head tank 310 can be supplied to the head 51. The head tank 310 is an example of the storage portion RS. In the present embodiment, the ink in the head tank 310 attached to the attachment portion 12 is positioned on the +Z direction side with respect to a nozzle N that is positioned farthest in the −Z direction among the plurality of nozzles N of the head 51. In the present embodiment, as an opening/closing valve 12*v* is provided in the head channel 54, the ink inside the head 51 is maintained at a negative pressure. The opening/closing valve 12*v* is a differential pressure valve that is opened when a pressure of the ink in the common liquid chamber 53 becomes lower than a pressure of the ink in the head tank 310 by a predetermined pressure.

In this case, when the position of the head tank 310 with respect to the head 51 is changed upward from its normal position due to a change in posture of the main body 2, the ink in the head 51 becomes higher than the atmospheric pressure, and thus, there is a possibility that the ink leaks from the nozzles N. Therefore, in the present embodiment, the head tank 310 attached to the attachment portion 12 of the head unit 50 is provided at a position between the head 51 and the left side surface 2L in the X-axis direction. With this configuration, when lifting the main body 2 by gripping the first handle portion Hd1 and the second handle portion Hd2, the position of the head tank 310 with respect to the head 51 is positioned lower than the normal position, so that leakage of the ink from the head 51 can be suppressed.

When the head tank 310 is provided in such a way as to be not detachable from the head unit 50, the head tank 310 and the liquid storage bag 210 illustrated in FIG. 10 may be coupled to each other by the supply channel 67, for example. Then, the control unit 92 may drive and control a pump provided in the middle of the supply channel 67 to supply the ink stored in the liquid storage bag 210 to the head tank 310. In this case, the pressure of the ink in the head 51 is adjusted to a negative pressure by using the opening/closing valve 12*v* and the water head of the ink stored in the head tank 310. Therefore, the liquid storage bag 210 in the present embodiment may be disposed at a position where the center of the bag body 211 is 500 mm below the air-liquid interface formed in the nozzles N, for example. Further, the storage portion RS in the present embodiment is the head tank 310.

What is claimed is:

1. A liquid ejecting device comprising:
- an ejecting portion that ejects liquid;
- a storage portion that stores the liquid to be supplied to the ejecting portion and is coupled to the ejecting portion;
- a main body that includes the ejecting portion and the storage portion;
- a first handle portion that is grippable and provided in a first side surface of the main body; and
- a second handle portion that is grippable and provided in a second side surface of the main body, the second side surface facing the first side surface, wherein
- the storage portion is provided at a position between the ejecting portion and the first side surface in a horizontal direction, and
- the first handle portion is positioned higher than the second handle portion in a direction of gravity.

2. The liquid ejecting device according to claim 1, wherein
- the storage portion is positioned lower than the ejecting portion in the direction of gravity.

3. The liquid ejecting device according to claim 2, wherein
- the storage portion is opened to an atmosphere.

4. The liquid ejecting device according to claim 2, wherein
- the ejecting portion is provided on a second side surface side with respect to a center of the main body, and
- the storage portion is provided on a first side surface side with respect to the center of the main body.

5. The liquid ejecting device according to claim 1, wherein
- the ejecting portion ejects the liquid in a first direction that intersects the horizontal direction and the direction of gravity, and
- the second side surface is provided in the first direction.

6. The liquid ejecting device according to claim 5, wherein
- the ejecting portion is configured to be displaced in the first direction, and
- when viewed from a direction orthogonal to the first direction, a second angle between a straight line connecting the first handle portion and the second handle portion and the horizontal direction is smaller than a first angle between the first direction and the horizontal direction.

7. The liquid ejecting device according to claim 1, further comprising a waste liquid storage portion that is provided in the main body, stores the liquid discharged from the ejecting portion, and is coupled to a receiving portion that receives the liquid discharged from the ejecting portion, wherein
- the waste liquid storage portion is provided at a position between the receiving portion and the first side surface in the horizontal direction.

8. The liquid ejecting device according to claim 1, further comprising:

a third handle portion that is grippable and provided in a third side surface of the main body, the third side surface intersecting the first side surface and the second side surface; and a fourth handle portion that is grippable and provided in the third side surface, wherein the third handle portion and the fourth handle portion are positioned lower than the first handle portion in the direction of gravity.

9. The liquid ejecting device according to claim 8, wherein the second handle portion, the third handle portion, and the fourth handle portion are provided at the same height in the direction of gravity.

10. The liquid ejecting device according to claim 8, further comprising a display portion that displays a setting screen of the main body and protrudes from a fourth side surface facing the third side surface.

11. The liquid ejecting device according to claim 1, wherein the first handle portion is positioned lower than a center of gravity of the main body in the direction of gravity.

* * * * *